United States Patent
Yoakim

(10) Patent No.: US 11,049,354 B2
(45) Date of Patent: *Jun. 29, 2021

(54) BEVERAGE PREPARATION MACHINE SUPPORTING A REMOTE SERVICE FUNCTIONALITY

(71) Applicant: NESTEC S.A., Vevey (CH)

(72) Inventor: Alfred Yoakim, St-legier-la Chiesaz (CH)

(73) Assignee: Societe des Produits Nestle S.A., Vevey (CH)

( * ) Notice: Subject to any disclaimer, the term of this patent is extended or adjusted under 35 U.S.C. 154(b) by 260 days.

This patent is subject to a terminal disclaimer.

(21) Appl. No.: 16/112,177

(22) Filed: Aug. 24, 2018

(65) Prior Publication Data

US 2018/0365924 A1    Dec. 20, 2018

Related U.S. Application Data

(62) Division of application No. 13/513,781, filed as application No. PCT/EP2010/068480 on Nov. 30, 2010, now Pat. No. 10,078,934.

(30) Foreign Application Priority Data

Dec. 2, 2009    (EP) .................................... 09177746

(51) Int. Cl.
*G07F 13/06*    (2006.01)
*G07F 9/02*    (2006.01)
(Continued)

(52) U.S. Cl.
CPC ........ *G07F 13/065* (2013.01); *A47J 31/3623* (2013.01); *A47J 31/4492* (2013.01);
(Continued)

(58) Field of Classification Search
CPC .... A47J 31/3623; A47J 31/4492; A47J 31/52; A47J 31/521; A47J 31/525;
(Continued)

(56) References Cited

U.S. PATENT DOCUMENTS 4,377,049 A    3/1983    Simon et al.
4,458,735 A    7/1984    Houman
(Continued)

FOREIGN PATENT DOCUMENTS

AT    410377    4/2003
CH    682798    11/1993
(Continued)

OTHER PUBLICATIONS

Canadian Office Action in corresponding application No. 2,781,825 dated Feb. 15, 2018, 4 pages.
(Continued)

*Primary Examiner* — Dana Ross
*Assistant Examiner* — Ket D Dang
(74) *Attorney, Agent, or Firm* — K&L Gates LLP

(57) ABSTRACT

The present invention relates to a method for remotely providing service functionalities for a beverage preparation machine. The beverage preparation machine is adapted for preparing a beverage by receiving a capsule in a capsule extraction unit, circulating a carrier liquid, such as water in particular heated water, through said capsule in the extraction unit and by dispensing a resulting beverage. The machine is in data communication with a remote server via a communication network. The machine monitors parameters related to the machine and submits the monitored parameters to the server. The server initiates a service functionality depending on the submitted parameters. The present invention further relates to a beverage preparation machine adapted to support such a method and to a system (Continued)

for remotely providing service functionalities for a beverage preparation machine at a customer location.

11 Claims, 5 Drawing Sheets

(51) Int. Cl.
*A47J 31/52* (2006.01)
*A47J 31/44* (2006.01)
*A47J 31/36* (2006.01)
*G07F 9/00* (2006.01)

(52) U.S. Cl.
CPC .............. *A47J 31/52* (2013.01); *G07F 9/002* (2020.05); *G07F 9/026* (2013.01)

(58) Field of Classification Search
CPC ................ A47J 31/5251; A47J 31/5253; A47J 31/5255; G07F 13/065; G07F 9/002; G07F 9/026
USPC .................. 99/275; 700/231, 236, 241, 244; 705/26.1, 28; 222/25, 61, 70
See application file for complete search history.

(56) References Cited

U.S. PATENT DOCUMENTS

| | | | |
|---|---|---|---|
| 4,554,419 A | 11/1985 | King et al. | |
| 4,767,632 A | 8/1988 | Meier | |
| 4,954,697 A | 9/1990 | Kokubun et al. | |
| 5,080,008 A | 1/1992 | Helbling | |
| 5,312,020 A | 5/1994 | Frei | |
| 5,335,705 A | 8/1994 | Morishita et al. | |
| 5,372,061 A | 12/1994 | Albert et al. | |
| 5,375,508 A | 12/1994 | Knepler et al. | |
| 5,408,917 A | 4/1995 | Luessi | |
| 5,442,997 A | 8/1995 | Branz et al. | |
| 5,645,230 A | 7/1997 | Marogna et al. | |
| 5,731,981 A | 3/1998 | Simard | |
| 5,836,236 A | 11/1998 | Rolfes et al. | |
| 5,959,869 A | 9/1999 | Miller et al. | |
| 6,182,555 B1 | 2/2001 | Scheer et al. | |
| 6,354,341 B1 | 3/2002 | Saveliev et al. | |
| 6,629,080 B1 | 9/2003 | Kolls | |
| 6,659,072 B2 | 12/2003 | Heinzelmann | |
| 6,751,525 B1 | 6/2004 | Crisp | |
| 6,759,072 B1 | 7/2004 | Gutwein et al. | |
| 7,263,283 B2 | 8/2007 | Knepler | |
| 7,281,467 B2 | 10/2007 | Cai | |
| 7,907,835 B2 | 3/2011 | Boussemart et al. | |
| 2001/0032036 A1 | 10/2001 | Sudolcan et al. | |
| 2003/0191558 A1 | 10/2003 | Arellano | |
| 2004/0159240 A1 | 8/2004 | Lyall | |
| 2005/0016385 A1 | 1/2005 | Brunkemper et al. | |
| 2005/0034606 A1 | 2/2005 | In Albon | |
| 2005/0115986 A1 | 6/2005 | Saunders et al. | |
| 2005/0150391 A1 | 7/2005 | Schifferle | |
| 2005/0284302 A1 | 12/2005 | Levin | |
| 2006/0201107 A1 | 9/2006 | Kim | |
| 2007/0157622 A1 | 7/2007 | Fusco | |
| 2007/0157820 A1 | 7/2007 | Bunn | |
| 2008/0164284 A1 | 7/2008 | Ternite | |
| 2008/0168905 A1* | 7/2008 | Hart | A47J 31/5253 99/280 |
| 2008/0183330 A1 | 7/2008 | Monn | |
| 2009/0069930 A1* | 3/2009 | Peters | G07F 9/002 700/236 |
| 2012/0173357 A1* | 7/2012 | Yoakim | A47J 31/4403 705/26.1 |

FOREIGN PATENT DOCUMENTS

| | | |
|---|---|---|
| DE | 4429353 | 2/1996 |
| DE | 20200419 | 5/2002 |
| DE | 10138455 | 2/2003 |
| DE | 2006019039 | 3/2007 |
| EP | 1302138 | 4/2003 |
| EP | 1676509 | 7/2006 |
| EP | 1448084 | 8/2008 |
| EP | 2085000 | 8/2009 |
| EP | 9169800 | 7/2012 |
| FR | 2624844 | 6/1989 |
| GB | 2397510 | 7/2004 |
| WO | 9725634 | 7/1997 |
| WO | 9950172 | 10/1999 |
| WO | 02/12112 | 2/2002 |
| WO | 02/23735 | 3/2002 |
| WO | 0228241 | 4/2002 |
| WO | 02/45559 | 6/2002 |
| WO | 2004030435 | 4/2004 |
| WO | 2004030438 | 4/2004 |
| WO | 2006021825 | 3/2006 |
| WO | 2006/050563 | 5/2006 |
| WO | 2006063645 | 6/2006 |
| WO | 2006090183 | 8/2006 |
| WO | 2007003062 | 1/2007 |
| WO | 2007003990 | 1/2007 |
| WO | 20080104751 | 9/2008 |
| WO | 2008138710 | 11/2008 |
| WO | 2008138820 | 11/2008 |
| WO | 2009016490 | 2/2009 |
| WO | 20090074550 | 6/2009 |
| WO | 2009130099 | 10/2009 |
| WO | 2009135821 | 12/2009 |
| WO | 2011067232 | 6/2011 |

OTHER PUBLICATIONS

Australian Office Action for Application No. 2010326818, dated Jul. 6, 2015, 4 pages.
International Search Report dated Mar. 15, 2011 for corresponding Intl. Appln. No. PCT/EP2010/068480.
Written Opinion dated Jun. 2, 2012 for corresponding Int. Appln No. PCT/EP2010/068480.
Bezzera BZ07 Instruction Manual. p. 1-15, 47-56. 25 pages.
Smarter Logic Model ETR-9090 microprocessor Based SMARTER LOGIC Auto Tune PID Controller. Manual No. 14A 22 pages.
Watlow Practical PID Guide for Process Control. Aug. 2005. 14 pages.
Notice of Opposition dated Feb. 9 in EP 11725434.2. 1 page.

* cited by examiner

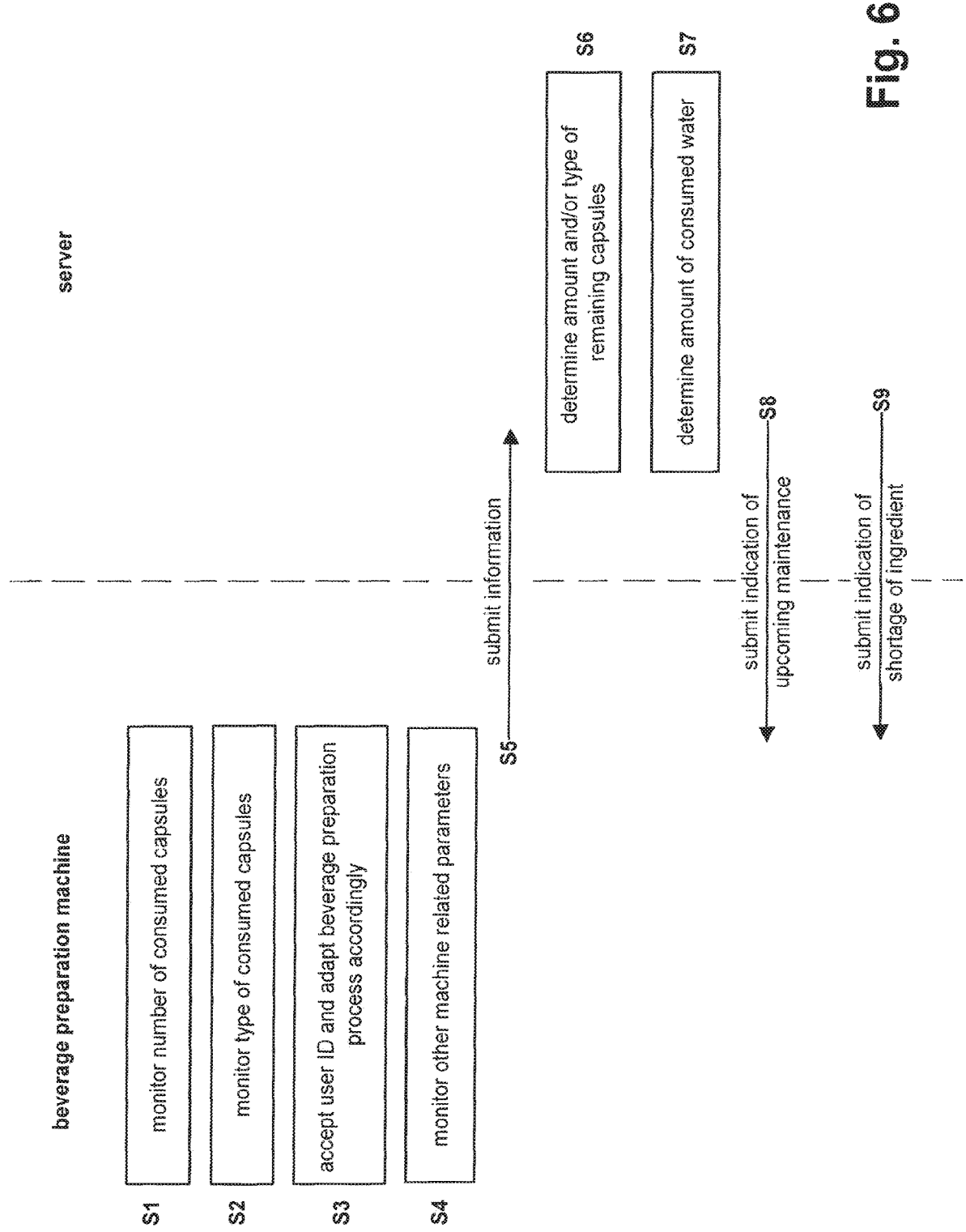

BEVERAGE PREPARATION MACHINE SUPPORTING A REMOTE SERVICE FUNCTIONALITY

PRIORITY CLAIM

This application is a divisional of U.S. application Ser. No. 13/513,781 filed Jun. 4, 2012, which is a National Stage of International Application No. PCT/EP10/068480 filed Nov. 30, 2010, which claims priority to European Patent Application No. 09177746.6 filed Dec. 2, 2009, the entire contents of which are incorporated herein by reference.

FIELD OF THE INVENTION

The field of the invention relates to a method and a system for remotely providing service functionalities for a beverage preparation machine and to beverage preparation machine being designed to support such remote service functionality.

For the purpose of the present description, a "beverage" is meant to include any liquid food, such as tea, coffee, hot or cold chocolate, milk, soup, baby food or the like. A "capsule" is meant to include any pre-portioned beverage ingredient within an enclosing packaging of any material, in particular an air tight packaging, e. g. plastic, aluminum, recyclable and/or bio-degradable packaging and of any shape and structure, including soft pods or rigid cartridges containing the ingredient.

BACKGROUND

Certain beverage preparation machines use capsules containing ingredients to be extracted or to be dissolved; for other machines, the ingredients are stored and dosed automatically in the machine or else are added at the time of preparation of the drink.

Most coffee or other beverage preparation machines possess filling means that include a pump for liquid, usually water, which pumps the liquid from a source of water that is cold or indeed heated through heating means, such as a heating resistor, a thermoblock or the like. Such filling means are usually controlled via a control unit of the machine, typically including a printed circuit board with a controller.

For allowing the user to interact with such machines, for providing operation instructions to the machine or obtaining feed-back there from, various systems have been disclosed in the art, for instance as mentioned in the following references: AT 410 377, CH 682 798, DE 44 29 353, DE 202 00 419, DE 20 2006 019 039, DE 2007 008 590, EP 1 302 138, EP 1 448 084, EP 1 676 509, EP 08155851.2, FR 2 624 844, GB 2 397 510, U.S. Pat. Nos. 4,377,049, 4,458,735, 4,554,419, 4,767,632, 4,954,697, 5,312,020, 5,335,705, 5,372,061, 5,375,508, 5,731,981, 5,645,230, 5,836,236, 5,959,869, 6,182,555, 6,354,341, 6,759,072, US 2007/0157820, WO 97/25634, WO99/50172, WO 2004/030435, WO 2004/030438, WO 2006/063645, WO 2006/090183, WO 2007/003062, WO 2007/003990, WO 2008/104751, WO 2008/138710, WO 2008/138820 and WO 2009/016490.

Nowadays beverage preparation machines have to fulfill an increasing number of tasks. This makes the machine more complex and it is thus difficult if not impossible for the customer to maintain and monitor the functionalities of the beverage preparation machine himself. Specifically in the case of B2B solutions, where the beverage preparation machines are commercially used and accessed by a plurality of different users, it is quite demanding to for the customer to always keep the machine in an optimum condition.

SUMMARY OF THE INVENTION

It is therefore an object of the present invention to improve the prior art.

It is therefore an object of the present invention to provide a method and system for remotely providing service functionalities for a beverage preparation machine as well as a beverage preparation machine being designed to support such service functionality, which allow maintaining the beverage preparation machine and its functionality with as less interaction as possible from the customer's side. It is further an object of the present invention to provide such a method, system and beverage preparation machine, which make the handling of the beverage preparation machine for the customer easy and simple. It is a further object to provide such a method, system and beverage preparation machine which allows to shift the workload regarding the maintenance and monitoring of the beverage preparation machine away from the customer and to provide service functionalities with a reduced interaction needed from the customer's side.

According to a first aspect the present invention relates to capsule based beverage preparation machine, comprising at least one sensor for monitoring machine related parameters, and a communication module for enabling communication with a remote server via a communication network and for submitting the monitored parameters to the remote server, wherein the communication module is further adapted to receive from the server an indication of a necessary service functionality depending on the submitted parameters.

According to a second aspect the present invention relates to a method for remotely providing service functionalities for a beverage preparation machine, said beverage preparation machine being adapted for preparing a beverage by receiving a capsule in a capsule extraction unit, circulating a carrier liquid, such as water in particular heated water, through said capsule in the extraction unit and by dispensing a resulting beverage, and being in data communication with a remote server via a communication network, the method comprising the steps of monitoring by the beverage preparation machine parameters related to the machine, submitting the monitored parameters to the server, and initiating by the server a service functionality depending on the submitted parameters. In an embodiment, the step of monitoring may further comprise: monitoring by the beverage preparation machine the number of consumed capsules and automatically recognizing by the beverage preparation machine the type of each consumed capsule.

The step of initiating a service functionality comprises comparing for each type of capsule an initial amount of capsules within the beverage preparation machine with the actual remaining amount of capsules, and in case of detecting a reaching of a shortage of capsules at the beverage preparation machine, generating automatically an instruction:

a) to invite the customer to make an order for a shipment of a new stock of capsules, or b) to prepare a shipment of a new stock of capsules for supply to said customer.

It allows notably providing a solution to help the user managing resources that cannot be easily counted by the machine. In fact, contrary to vending machines for example, the user may introduce different type of capsules, generally not directly managed and stored within the capsule based beverage preparation machine. The invention allows the machine to manage capsules stocks by recognizing different types of capsules and by providing an adapted stock management taking into consideration the number of capsules, for each different type of capsules, actually brewed by the machine.

According to a third aspect the present invention relates to a beverage preparation machine comprising a control unit and a communication module designed to support the method according to the second aspect.

According to a further aspect the present invention relates to programs on a memory device for remotely providing service functionalities, wherein said programs when being executed are arranged to perform the steps of the method according to the second aspect and/or third aspect.

These programs for remotely providing service functionalities comprise electronic data-processing program code instructions, intended to be executed by a processing unit such a processor or a controller. Consequently, the invention relates also to programs on an information support, for remotely providing service functionalities. These programs may use any programming language, and may be in the form of source code, object code, or intermediate code between source code and object code, such partially compiled code, or any suitable other form.

The invention relates also to information supports readable by a machine, and on which are stored instructions of the programs as mentioned above. The information supports may be any suitable device capable of storing said programs. For example, it may comprise storage means, comprising a CD-ROM, USB key, FLASH memories, or a ROM of a microelectronic circuit, or a magnetic storing means, like a floppy or hard drive. Moreover, the information support may be a transmissible support, such as an electrical or optical signal, which can be transported by an optical or electrical wire, by radiofrequency means or by any suitable coupling means. Theses programs may be in particular downloaded from a network connected to Internet.

The information support may also be an integrated circuit in which these programs are incorporated, the circuit being adapted to execute or to be used to execute these programs.

According to yet a further aspect the present invention relates to a system for remotely providing service functionalities for a beverage preparation machine, comprising a beverage preparation machine being adapted for preparing a beverage by receiving a capsule in a capsule extraction unit, circulating a carrier liquid, such as water in particular heated water, through said capsule in the extraction unit and by dispensing a resulting beverage, and a remote server being in data communication with the beverage preparation machine via a communication network, wherein the beverage preparation machine is adapted to monitor machine related parameters and to submit the monitored parameters to the server, and wherein the server is adapted to initiate a service functionality depending on the submitted parameters.

Further features, advantages and objects of the present invention will become evident by means of the Figures of the enclosed drawings as well as by the following detailed explanation of illustrative-only embodiments of the present invention.

BRIEF DESCRIPTION OF THE DRAWINGS

The invention will now be described with reference to schematic drawings:

FIG. 6 shows a schematic overview over the process steps of the method according to the present invention.

DETAILED DESCRIPTION

Figure 1A:
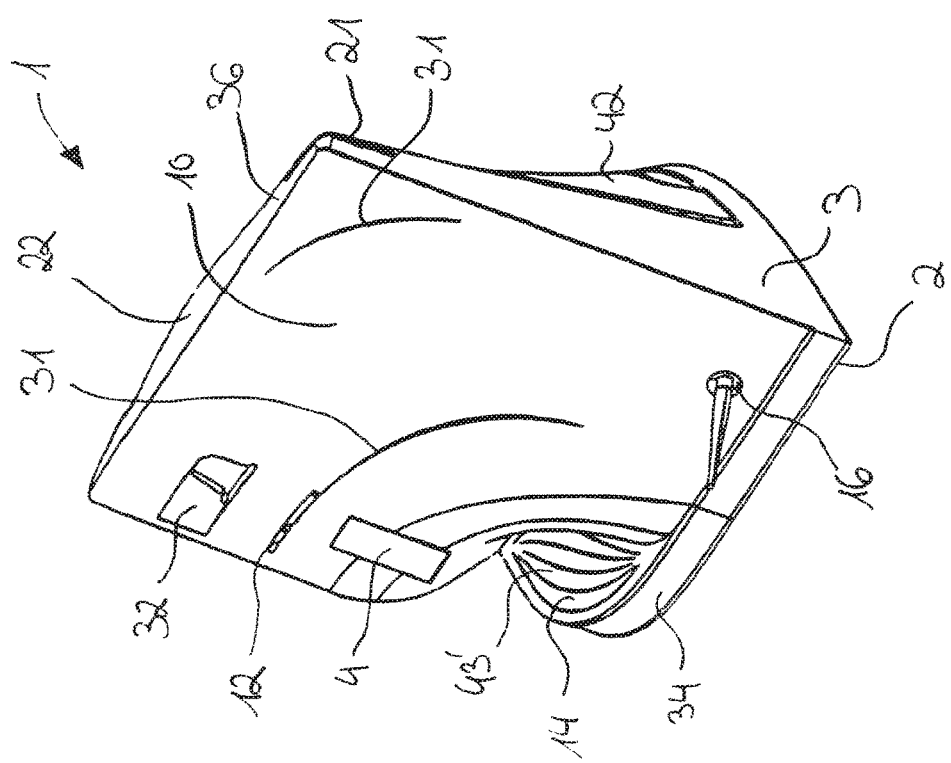
FIGS. 1a, 1b, 2a and 2b show different perspective views of a beverage preparation machine according to the present invention.

The machine according to the present invention can be a coffee, tea or soup machine, in particular a machine for supplying a beverage or liquid food by passing hot or cold water or another liquid through a capsule containing an ingredient of the beverage or liquid food to be supplied, such as ground coffee.

For example, the preparation machine comprises: an ingredient processing arrangement including one or more of a liquid reservoir, liquid circulation circuit, a heater, a pump and a beverage preparation unit arranged to receive capsules for use and evacuate capsules upon use; a housing having an opening leading into a seat to which capsules are evacuated from the preparation unit; and a receptacle having a cavity forming a storage space for collecting capsules evacuated to the seat into the receptacle to a level of fill. The receptacle is insertable into the seat for collecting capsules and is removable from the seat for emptying the collected capsules. Examples of such ingredient processing arrangements are disclosed in WO 2009/074550 and in WO 2009/130099, which are incorporated herein by reference.

The machine may include an interface as described in PCT/EP09/058540 and/or be in a network for reordering capsules as described in EP 09169800.1.

The machine may comprise a user-interface screen for providing information to the user and/or for accepting input by the user. The user-interface screen can be a touch-sensitive screen and/or comprise touch-sensitive input parts. The machine may have a user-input device, such as a touch pad, one or more buttons and/or switches or similar devices known in the art. The user-interface screen can be stylus sensitive.

A stylus may for instance be used to select predefined options displayed on the interface-screen or to write notes and messages on the user-interface screen that may be stored by the machine and re-accessible later. Hence, the screen may be used as a substitution for a post-it. Hereby, it may be possible to select different colors when writing on the screen.

According to the present invention, the liquid food or beverage preparation machine has an interface for connection to a remote network, such as a network for accessing remote data displayable on the user-interface screen and/or for transferring local data acquired via the user interface screen, in particular a network for: supplying visual and/or audio information in relation with a liquid food or beverage that can be requested by the user; and/or for ordering, in particular from a remote supplier, goods such as liquid food or beverage ingredients or a service related to this machine by using the user-interface screen.

Hence, the user may be given the technical possibility to order directly through the beverage preparation machine liquid food or beverage ingredients that are missing or at a low level, or request directly through this machine the most up to date information on a particular item, in particular a liquid food or beverage he has requested or intends to request the machine to prepare or order from the supplier.

Moreover, the user-interface screen can be arranged to perform at least one function selected from: displaying information to the user regarding a parameter of the machine that requires a user intervention, displaying locally stored and/or remotely emitted graphic or text matter, a notepad function, and a visual ambiance generator, for instance by displaying appropriate pictures or moving color shapes, for instance of the screen-saver type.

In order to noticeably affect the ambiance surrounding the machine by visual effects, the user-screen has to dominate the user-visible part of the machine. An interface screen of small size and/or lost somewhere on the user-visible part of the machine will not provide an optimal ambiance effect.

Furthermore, the liquid food or beverage preparation machine may include a sound input and/or output device. The sound device can be arranged to cooperate with the user-interface screen, in particular a sound device arranged to cooperate functionally with the screen, such as a sound device for providing melodic acoustic feed back in reaction to a user-input on the user-interface screen and/or cooperating with the screen so that harmonious visual feed-back is generated on the user-interface screen in reaction to an audio signal. The sound device may include a voice recognition arrangement so as to be able to receive vocal user-commands and/or to link a particular user profile from a voice analysis.

For example, the user-interface screen may be arranged to display a movie, news, weather forecast, stock exchange information or anything alike while the machine is preparing a liquid food or beverage, so that the user does not have to wait until the liquid food or beverage is prepared to move on to such activities but can do them right from the beginning, with a comfortable interface screen whose functionalities go significantly beyond mere input and/or output of data.

Such liquid food or beverage preparation machines are particularly handy for preparing a liquid food or beverage during an on-going broadcasted radio or TV program. The user may thus get himself a liquid food or beverage while he is following such a program on an ordinary TV or radio and still continue to follow the program on the beverage preparation machine. Hence, the user will not be attempted to wait the end of the program or an advertising break. The beverage preparation machine may include a receiver that is capable of reacting to a remote control device, such as an IR or radio remote control device, in particular a remote control device compatible with a radio or television, so that the user may start-up the food or beverage preparation machine from a distance, in particular while he is sitting in front of his TV or nearby the radio. The liquid food or beverage preparation machines may of course be connected to a DVD or other media source so that the user can follow his favourite programs while he is preparing a liquid food or beverage.

The machine can be substantially formed by a main body having a rectangular front side being dominated by the user-interface screen and a foot portion larger than the top portion, so that the main body is tapering from the foot portion to the top portion. The main body may include at least one of: a drip tray having a support member for a receptacle to be filled with a liquid food or beverage, a capsule collector, and a liquid supply reservoir such as a water reservoir.

Moreover, the machine may have a liquid food or beverage outlet located above an area for receiving a receptacle to be filled, the outlet preferably being hidden by the user-interface screen. For instance, the outlet is located perpendicularly behind the user-interface screen. In fact, the entire area or a substantial part thereof can be located perpendicularly behind the user-interface screen.

Thus, in addition of providing a user-interface screen configuration on the machine that naturally and durably captures the user's attention, the machine's outlet, and optionally the receptacle located there under, may be hidden from the user's visual field so as avoid distraction of the user's attention by parts and/or operations of the machine other than those relating to the user-interface screen.

As already mentioned, the present invention relates to a machine connectable to a data-exchange network, the machine being configured for preparing a beverage in particular from a pre-portioned beverage ingredient in a capsule.

For this purpose, the machine comprises a communication module for connecting the machine to said network via a wired or wireless connection. The network to which the communication module is connectable may be the internet, an intranet, GSM network, UMTS network, Bluetooth network, infrared (IR) or a similar network to which one or more distant computers, servers and terminals are connected for communicating with the communication module of the beverage preparation machine. Hereby, the term "network" is intended to refer to a system comprising the machine according to the present invention and at least one further device, which are connected to each other via a communication link for one-directional or bi-directional communication. In case that a connection to more than one device is provided, the machine can also be connected to different devices via different types of communication networks.

Without controlling or participating to the control of the ingredient processing arrangement, the communication module may be configured in the beverage preparation machine to monitor certain aspects of the machine and, in particular, communicate such aspects onto the network to a remote server.

The machine further comprises a control unit for controlling all processes within the machine. In one embodiment, the control unit is arranged to communicate data to the communication module, the data relating to at least one of: the beverage preparation process; the ingredient processing arrangement; the control unit and/or beverage preparation settings. This information may then be communicated (or not) to a distant server and be processed for general or particular commercial or servicing or repair or counselling purpose.

In an even safer embodiment, the control unit is prevented from communicating with the communication module. In this case, the communication is not even unidirectional like above but inexistent. Hence, the control unit is configured to receive no signal at all from the communication module not even a signal for an information request. In this embodiment, no data communication channel is needed between the control unit and the communication module.

Typically, the ingredient processing arrangement comprises one or more sensors for measuring parameters of the status of the ingredient processing arrangement and/or the beverage preparation process. For instance, such sensors may include at least one of: temperature sensors, a pressure sensor, a flowmeter, an electric power sensor, an overheat sensor, a scale sensor, a water level sensor, an ingredient recognition sensor, etc. . . . . . Such sensors are usually connected to the control unit.

In an embodiment, the communication module can be arranged to receive information from at least one of the sensor(s). The communication module may be directly connected to the sensors, usually in parallel to the control unit, or it may be indirectly connected to the sensor(s) via the control unit and typically be communicated a sensor-related information after processing by the control unit.

Normally, the control unit is connected to a beverage preparation user-interface. The user would use this user-interface to operate the ingredient processing arrangement via the control unit.

Typically, the communication module is connected to a communication user-interface. The user would use this user-interface to retrieve information from the network or retrieve information therefrom.

Such user-interfaces may include screens and touch screens, buttons, switches, etc. . . . as known in the art.

Preferably, the control unit is connected to a beverage preparation user-interface and the communication module is connected to a communication user-interface, the beverage preparation user-interface and the communication user-interface being juxtaposed. In particular, the beverage preparation user-interface can be flush with the communication user-interface. The beverage preparation user-interface and the communication user-interface may be disposed in a single user-interface canvas. Hence, the disposition of the user-interfaces may be such as to appear like a single interface providing all the user-access to the control unit and the communication module.

Whereas the control unit and the communication module may be digitally and/or physically, entirely or partly, separated within the machine, the corresponding user-interfaces may be configured as an apparent single interface. Hence, the user is confronted with a single or concentrated user-interface arrangement to avoid the dispersion of his/her attention all over the beverage preparation machine.

Typically, the beverage preparation machine comprises a housing for housing: the ingredient processing arrangement; the control unit; and the communication module. This housing would normally also bear the user-interfaces.

For instance, the communication module is arranged to receive from the network and communicate via user-communication means, such as a display and/or loudspeaker, information relating to at least one of: a need to carry out a particular service; a need to repair said machine; and information on a particular ingredient that is being processed in said machine. When the communication module is configured to monitor the machine operation and/or components of the machine, the corresponding information may be communicated to a distant server of the network for evaluation and generation of suggestions to the user, for instance, via the communication module. For example, via appropriate sensor systems, the communication module may monitor the ingredient consumption and suggest timely reordering when the stock of ingredient is low or send general information regarding the ingredient or beverage that is being processed for display on the machine. Instead of a mere suggestion to reorder ingredients, e.g. proportioned ingredients capsules, the system may be configured to proceed to automatic reordering when the ingredient stock is low.

The communication module may be arranged for remote monitor of the service periods, for instance for carrying out a descaling process or for general maintenance. The communication module may communicate various parameters of the ingredient processing arrangement and the control unit for diagnosis purposes and/or for carrying out a market survey as to the user's preferences, for instance the actually used ratios of different ingredients. Hence, a distant server may monitor the preferred volume of beverage dispensing with certain ingredients, etc.

More generally, the communication module may be arranged to receive from the network and communicate via user-communication means, such as a display and/or loudspeaker, information relating to: handling of this type of machine by a user, e.g. provide an on-line user manual and/or beverage recipes; advertising relating to beverage preparation machines, accessories, one or more ingredients that are being processed or related products; general information relating to one or more ingredients for the beverage processing; and visualization and/or music for generating an ambiance relating to such beverages or preparations thereof or consumptions thereof; and news and/or weather forecast, etc. . . . . For example the communication module with the appropriate user-interface may be configured to permit distant ordering of ingredients via the network.

The beverage preparation machine can be arranged to automatically monitor the capsule consumption and send a capsule order to the supplier server whenever the automatic monitoring indicates a reaching of a shortage of consumable ingredient capsules at the customer location, the supplier server being arranged to receive the capsule order and to generate a corresponding instruction to prepare a shipment of a new stock of capsules for supply to the customer.

The beverage preparation machine may be arranged to communicate automatically the capsule consumption to the supplier server that is arranged to automatically monitor the capsule consumption and to generate the above instruction.

The machine's capsule extraction unit can be arranged to receive different types of ingredient capsules for preparing different beverages. For example, the extraction unit is arranged for receiving different coffee capsules types selected from capsules of arabica, robusta, canefora, etc. . . . and blends thereof, e.g. the NESPRESSO™ capsule ranges of capsule types, of the in-home or the out-of-home beverage preparation machine standards.

In an embodiment, the beverage preparation machine has an automatic capsule recognition arrangement.

For example, the capsule recognition system is of the type disclosed WO02/28241 which discloses a coffee machine using capsules with a machine interpretable feature that can be read automatically by the machine via a sensor. The machine interpretable feature on the capsule may include one or more of a colour, a shape, a glyph, a text string a barcode, a digital watermark, symbols, notches, grooves or holes. The machine interpretable feature on the capsule may be obtained by measuring characteristics of the capsule and/or may be obtained by receiving or reading information from the capsule, for example identification data emitted by a radiofrequency component embedded in the capsule. The measured characteristics may be included in the following non exhaustive list: color, resistivity, capacitance, variation of the magnetic field, magnetic induced field, geometry, code bar, identifier, signal, electromagnetic echo, weight, and mechanical parameter. Some characteristics may be obtained passively without interacting with the capsule. For instance, it is possible to recognize an outside color of a part of the capsule. Other characteristics may be obtained actively in interacting with the capsule. For example it can be applied an alternative current to the capsule and then measured parameters of the inductive field generated this way and/or resistivity and/or capacitance of the detected capsule.

For instance, the capsule extraction unit is arranged to receive different types of ingredient capsules for preparing different beverages, the automatic capsule recognition arrangement being arranged to identify the type of the capsules that are being used.

Indeed, when different capsule types are likely to be used in the same extraction unit, it is not sufficient to count the number of extraction processes carried out to derive the remaining capsule stock. The types of capsules should be identified by the machine so as to provide a differentiated management system aligned to the different capsule types.

Figure 1B:
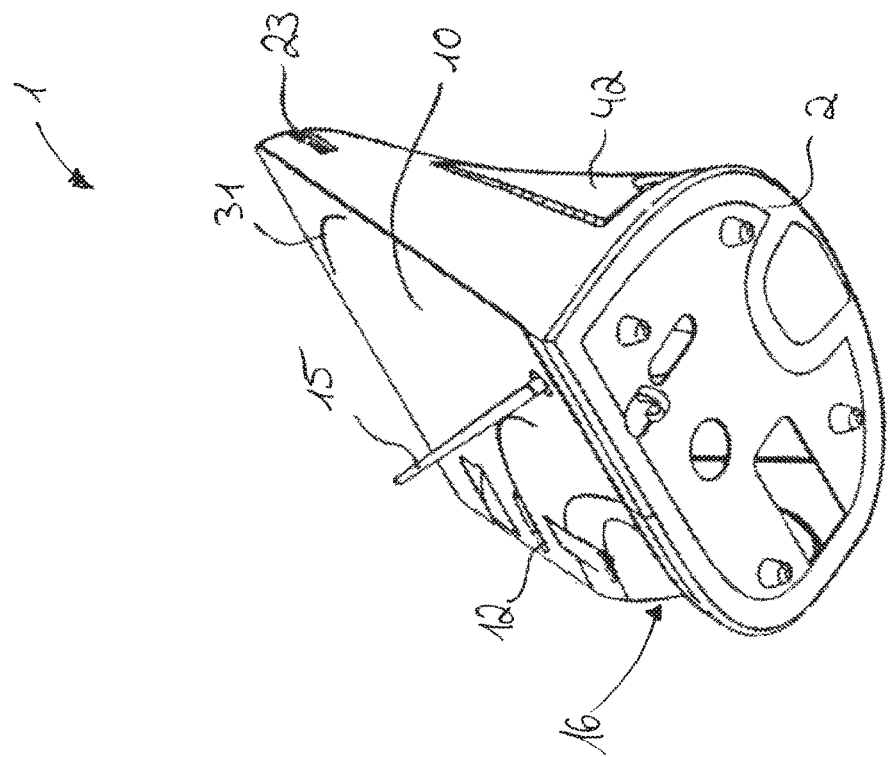
Figure 2B:
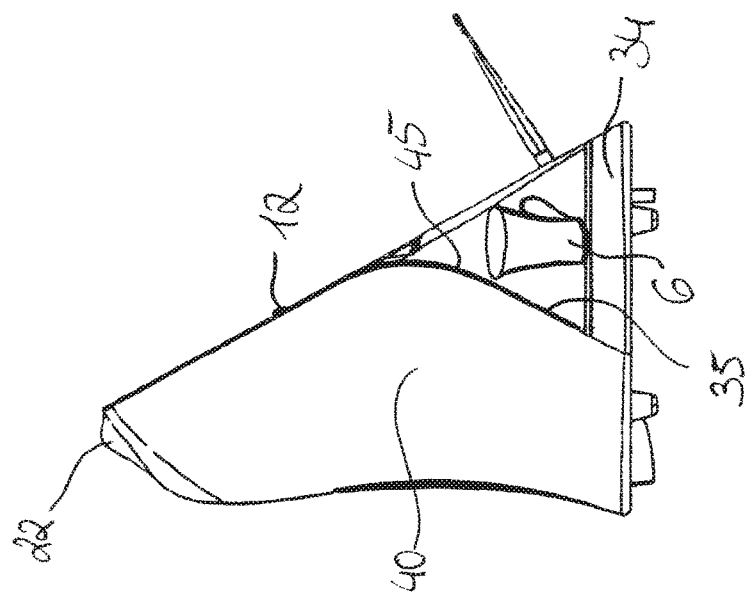
Figure 2A:
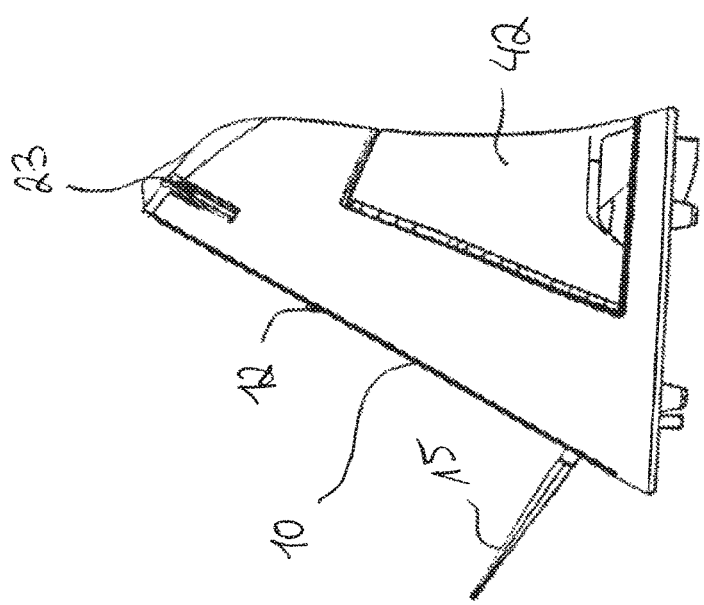

In the following with reference to FIGS. 1a, 1b, 2a and 2b the beverage preparation machine 1 according to the present invention and its basic functionalities will be described. Hereby, FIG. 1a is a perspective top view of the beverage preparation machine 1, FIG. 1b is a perspective bottom view, FIG. 2a is a side view on a first side of the beverage preparation machine 1 and FIG. 2b is a side view on the second side of the beverage preparation machine.

In the following the machine 1 will be described as coffee preparation machine, however, it is noted that the present invention is not limited to a coffee preparation machine but comprises any other type of beverage preparation machine as previously explained.

The machine 1 has an arrangement 40 for processing one or more beverage ingredients to dispense a beverage, such as coffee. Arrangement 40 includes a reservoir 42 for liquid, preferably water, connected to a liquid circulation circuit with a pump, a heater and a coffee brewing unit, as known in the art. The brewing unit can be connected to a handle 4 pivotally mounted at the housing 3 of the machine 1. The handle 4 is arranged to allow introduction, extraction and removing of a capsule containing a ground coffee. Upon extraction, capsules are evacuated to a used capsule collector after activating the handle 4 again.

Additionally, machine 1 has a top portion 36 which may be used for holding spare cups. Top portion 36 may include a heating arrangement to preheat such spare cups. The cup heater may be of the resistive type, in particular a vapour circulation cup heater as known in the art, or any other suitable heating system. A spare capsule receptacle may also be located on top portion 36 of machine 1 for storing unused capsules.

Moreover, machine 1 has an outlet 45 from which the prepared beverage is dispensed into a receptacle or cup 6 placed underneath the outlet 45, as shown for example in FIG. 2b. A drip tray arrangement 34 is provided under outlet 45, for instance of the type disclosed in EP 1731065. For positioning cup 6 under outlet 45, drip tray may include a positioning arrangement at its surface 14 and/or walls 35 delimiting dispensing cavity may be positioned relative to outlet 45 to serve as references for a cup positioning, i.e. so that a cup 6 may simply be pushed against walls 35 to be properly positioned under outlet 45. Also provided is a used capsule collector (not shown in the Figures) in a central part of machine 1 for collecting used, extracted capsules.

The machine further comprises a screen or display 10. Preferably, the display 10 is a touch sensitive screen and may be operated by finger contact and/or with a stylus 15. Preferably, the stylus 15 when not being used can be placed into a corresponding recess 16 within the display 10 or any other part of the machine 1.

Furthermore, display 10 is associated with a pair of buttons 12, for example for quick operation of machine 1 without having to access display 10. Moreover, in a preferred embodiment, display 10 includes a touch sensitive surface for navigating through pages and menus displayable on display 10.

Display 10 may be arranged to display various information and/or visual effects, as for example mentioned above, including network information when the machine is connectable to a user-network. Moreover, machine 1 may include a sound generating arrangement with loudspeakers and/or microphone and be a true multimedia interactive device, as discussed above. The machine 1 thereby may be used to contribute to the ambience.

In addition to display 10 and/or housing 3 may in particular have a series of holes 31 on its lateral, rear and/or upper sides, in particular within display 10, for the emission of light, of various colors, to create such an ambiance. For this purpose LEDs of various can be provided within the holes 31.

Unlike prior art beverage preparation machines, drip tray 34, capsule receptacle and reservoir 42 are removable from the machine 1, in a movement underneath the display 10 and that goes away from display 10 and/or generally parallel to the foot portion 2 of the machine 1. The same applies to reservoir 42, which preferably is provided at the back of the machine beyond the display 1. It follows that during use and after use, when the machine is serviced, e.g. drip tray 34 emptied, display is not exposed to parts of machine 1 that might project liquid, such as liquid food or beverage, against screen 10.

Furthermore, machine 1 has a capsule inlet arrangement 32 for the supply of capsules containing an ingredient of the liquid food or beverage to be prepared, such as coffee. The capsule inlet arrangement 32 can be either provided on the lateral side of the machine or can be provided within the display 10. Preferably, the capsule inlet arrangement 32 is a recess within the display 10 having the shape of a capsule or any other object related to the prepared beverage.

The display 10 of the machine has not an entirely flat surface but on one side when approaching the foot portion 2, provides a recess. The recessing walls 35 of the display 10 together with the cup support 14 of the drip tray 34 thus provide a cavity 16 into which the cup 6 can be placed to be filled with the beverage dispensed from the outlet 45. To deemphasize the liquid food or beverage visual aspect of machine 1, the walls 35 of the display 10 within the cavity 16 can be used like a normal display, so that every object and/or image displayed on the display 10 extends into the cavity walls 35.

On the top portion 26 or on any other part of the machine, a touch sensor 22 can be provided enabling the user to control the machine and/or to navigate through the menu functions by carrying out a corresponding touch operation on the touch sensor 22. In case that the display 10 is a mere display and not a touch screen, the touch sensor 22 will make the control of the machine easier and more intuitive for the user. In case that the display 10 is a touch screen, then the user has the choice whether to use the display 10 or the touch sensor 22 for carrying out the touch operation. However, it might be advantageous to use the touch sensor 22 instead of the touch screen to avoid damage or contamination on the display 10.

The machine 1 can further comprise a card reader/writer 23. The card reader/writer 23 can either be a slot, into which a card can be inserted to carry out a reading and/or a writing operation on the card, the card reader/writer 23 can be a wireless interface enabling a wireless communication with a card, e.g. a radio frequency identification RFID card, or a combination thereof.

In order to provide an adjusted filling of the cup, an automatic filling system with a control of the level of fill may be implemented into the machine, for instance of the type disclosed in U.S. Pat. No. 4,458,735, WO97/25634 and WO99/50172.

Figure 3:
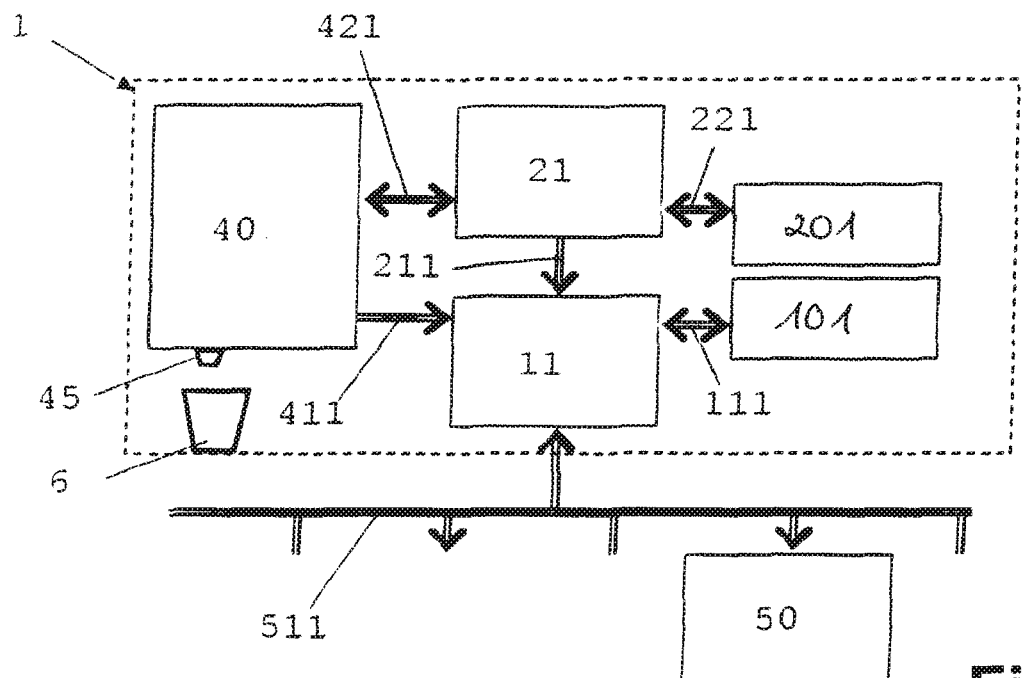
FIG. 3 shows a block diagram showing schematically the functional architecture of a beverage preparation machine according to the present invention being connected to a network.

FIG. 3 shows a functional block diagram of a beverage preparation machine 1 according to the present invention which is connected to a network 511.

Beverage preparation machine 1 includes a control unit 21 connected to a user-interface 201 via a bi-directional data communication channel 221. Control unit 21 is connected to the ingredient processing arrangement 40 for controlling the processing of the beverage ingredients. Typically, control unit 21 will control the powering of a heater and a pump and adjust the powering based on measured parameters of the beverage preparation process via sensors, such as temperature sensors, pressure sensors and flowmeters. Moreover, the control of the components of the ingredient processing arrangement 40 may be adjusted to the type of ingredient capsule extracted upon automatic recognition thereof via a capsule recognition system as known in the art, for instance an electromagnetic, mechanical, color or barcode recognition system.

Hence, ingredient processing arrangement 40 includes a series of sensors for returning information to control unit 21 relating to the state of arrangement 40 and of the beverage preparation process. Communication between control unit 21 and beverage preparation 41 is achieved via a bidirectional communication channel 421.

Furthermore, beverage preparation machine 1 has a communication module 11 for bidirectional communication with an external network 511, such as the internet or an intranet. Communication module 11 is connected to a user-interface 101, preferably in the form of the above mentioned display 10, preferably a touch screen, and possibly one or more buttons 12, via a bidirectional data communication channel 111. Display 10 in case of a touch screen may be operated by finger touch or by way of the stylus 15.

Preferably, control unit 21, communication module 11 and ingredient processing arrangement 40 are all contained within the housing 3 of beverage preparation machine 1. Alternatively, the communication module 11 can also be located outside the housing 3.

In accordance with the invention, communication module 11 is permanently prevented from controlling the processing of the beverage ingredients. In other words, communication module 11 of beverage preparation machine 1 may not act directly or indirectly via control unit 21 on arrangement 40 or affect the beverage preparation process or other processes carried out by arrangement 40.

Control unit 21 is prevented from accepting beverage preparation-related control data from communication module 11.

In the architecture of FIG. 3, the control unit 21 is arranged to communicate data to communication module 11 via unidirectional data communication channel 211. With the exception of a request for information and the signals necessary to ensure proper communication, e.g. data transmission control signals, control unit 21 will not receive any data from communication module 11. Conversely, the data transferred from control unit 21 to communication module 11 may relate to at least one of: the beverage preparation process; ingredient processing arrangement 40; beverage preparation settings stored in control unit 21; and/or the state of control unit 21, e.g. in the view of identifying any malfunctioning at a station 50 remotely connected to network 511.

It is also possible to connect communication module 11 directly to the sensors in the beverage preparation module 40. Likewise, communication between beverage preparation module 40 and communication module 11 is unidirectional via bus 411. However, this communication channel may become redundant if the data relating to the beverage preparation module 40 can be communicated to the communication module 11 via control unit 21. Communication channel 411 is particularly useful in the absence of communication channel 211, for instance when the control unit 21 should benefit from an increased protection against network 511.

Communication module 11 is arranged to receive from said network and communicate via user-communication interface, such as display 10 and/or loudspeaker, information relating to at least one of: a need to carry out a particular service, e.g. descaling; a need to repair said machine; and information on a particular ingredient that is being processed in said machine. For such information to be sent to communication module 11, corresponding information is first gathered together by communication module 21 from control unit 21 and/or ingredient processing arrangement 40 and sent to a remote server 50 that processes and analyses the information before returning, when appropriate warnings or other information to communication module 11 via network 511.

In another embodiment, control unit 21 is prevented from communicating at all with communication module 11, not even unidirectionally. There is no data communication channel between control unit 21 and communication module 11.

The highest degree of safety is achieved when communication module 11 is connected neither to control unit 21 nor to beverage preparation module 40. A slightly inferior protection is achieved when communication module 11 is allowed to read, via a unidirectional channel, sensors of beverage preparation module 40. A still lower safety is obtained when communication module is allowed to obtain information from control unit 21. To ensure immunity against any upsetting of ingredient processing arrangement 40 and the control unit 21 via network 511, the possibility, in particular any physical possibility, for communication module 11 to change parameters of the control unit 21 or beverage preparation unit 40 should be avoided.

As shown in FIGS. 1a and 1b beverage preparation user-interface 201 is flush with communication user-interface 101 and implemented as a combination of display 10, buttons 12, holes 31 comprising LEDs or the like, loudspeakers, microphones or the like.

A master switch for the machine 1 is also provided (not shown in the Figures). The master switch is arranged to connect and disconnect the powering of the various components of the beverage preparation machine, including communication module 11, control unit 21 and ingredient processing arrangement 40 all powered by the same power source, typically the mains.

Generally, communication module 11 can be arranged to receive from the network 511 and communicate via user-communication interface, such as a display 10 and/or loudspeaker, information relating to: handling of such machine 1 by a user; advertising relating to such machine 1 or related machines, accessories, and/or one or more ingredients for the beverage processing; general information relating to one or more ingredients for the beverage processing; visualization and/or music for generating an ambiance relating to said beverage or preparation thereof or consumption thereof; and news and/or weather forecast.

In an embodiment, the communication module 11 is adapted to provide an interface between the beverage preparation machine and an external communication device, said external communication device being adapted to handle bidirectional communications with the external network 511. In this embodiment, the communication module 11 may provide a specific physical interface to couple the control unit 21 and the external communication device, for example a Bluetooth, USB or a serial communication interface. The external communication device may be a computer, a personal digital assistant, a mobile phone/smart phone, or any suitable receiver/transceiver, adapted to be coupled with the communication module 11, and capable of communicating with entities coupled to the external network 5.

Figure 4:
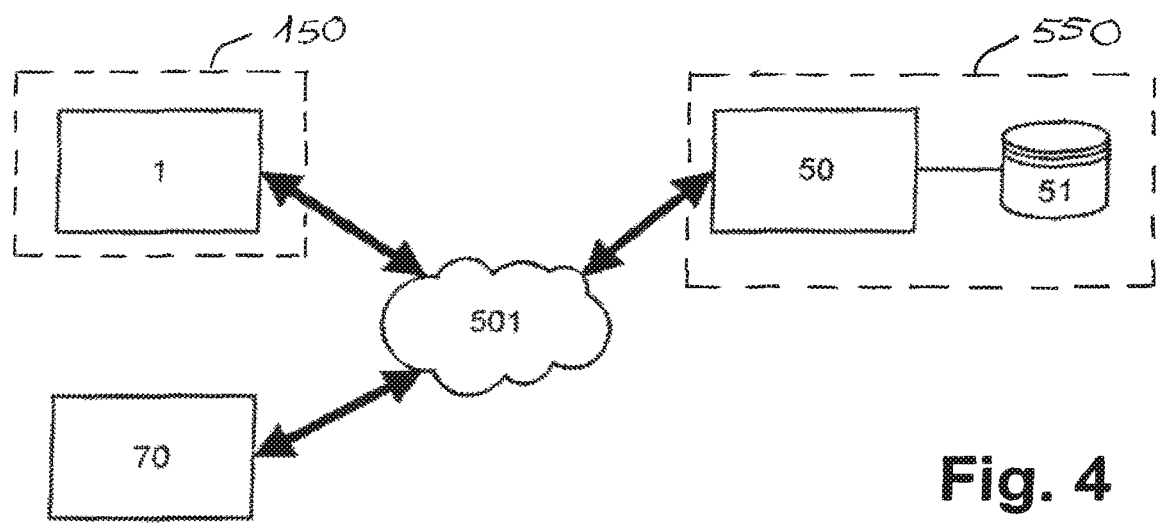
FIG. 4 shows a block diagram showing schematically the functional architecture of a network comprising a beverage preparation machine according to the present invention.

FIG. 4 shows a network comprising a machine 1 according to the present invention having network capabilities.

Connected to the communication network 501 is also a server 50, which for example can be associated to a capsule supplier and/or to a service centre for the machine 1. The server 50 can be further connected to a database 51 comprising data on users, capsules, machines, capsule consumption or the like. The machine 1 is hereby positioned at a customer location 150 being remote from a vendor location 550, where the server 50 is positioned.

The communication network 501 between the beverage preparation machine 1 and the server 50 in a preferred embodiment comprises a dedicated network such as a wireless network optionally of a type selected from GSM, GPRS, UMTS, in particular a dedicated network between the communication module 11 to a public network. This has the advantage that the beverage preparation machine 1 does not have to be connected to any type of intranet, which might cause security problems. Rather, a parallel intranet is provided for the purpose of connecting the beverage preparation machine 1 to the communication network 501.

In a preferred embodiment the beverage preparation unit 40 has a control module and the communication module 11 is connected to the control module. A communication program for communication to the server 50 is carried out by the control module of the beverage preparation unit 40 or a control module included in the communication module 11.

A user device 70 can further be connected to the network 501. Such a user device 70 can for example be a notebook, PC, mobile phone, PDA or any other user device having network communication capabilities.

Via the user device 70 the user can for example submit data, programs or information to the machine 1. For example he can load new or updated software or data into the machine 1. He can also change the settings of the machine remotely. Depending on the degree of communication possibilities between the control module 21 and the communication module 11, the user can also remotely start, stop or change a beverage preparation process. The user via the user device 70 can also log into the server 50 in order to change his personal user configurations, to submit a capsule order, to send a request for support or information or the like.

Even though in FIG. 4 the network 501 is shown as one single network connecting the machine 1, the server 50 and the user device 70, it is also possible that the different devices communicate via one or more separate network. Any type of network can be possible including a public or a private network, for example via Bluetooth, infrared, GSM, UMTS, Internet or any other type of wired or wireless communication network. Specifically, an intermediate device such as a telemetry device can be provided between the machine 1 and the network 501 in order to convert the corresponding data which are transmitted. The communication between respectively two of the devices, i. e. the machine 1, the server 50 and the user device 70 can be one- or bidirectional.

The present invention relates to a method and system for remotely providing service functionalities for a beverage preparation machine. The present invention further relates to a beverage preparation machine being designed to support such a remote service functionality. The machine 1 hereby preferably is a commercially used machine 1, which is run by a customer and offered to a plurality of different users.

A system according to the present invention, its components and the functionalities will be explained with reference to FIG. 5, which shows the functional architecture of a system 100 comprising a beverage preparation machine 1 and a server 50. As already explained with referent to FIG. 4, the beverage preparation machine 1 is provided at a customer location 150, which is remote from the vendor location 550, where the server 50 and optionally the database 51 are positioned.

Optionally, there can also be provided a user device 70 connected to the server 50.

Figure 5:
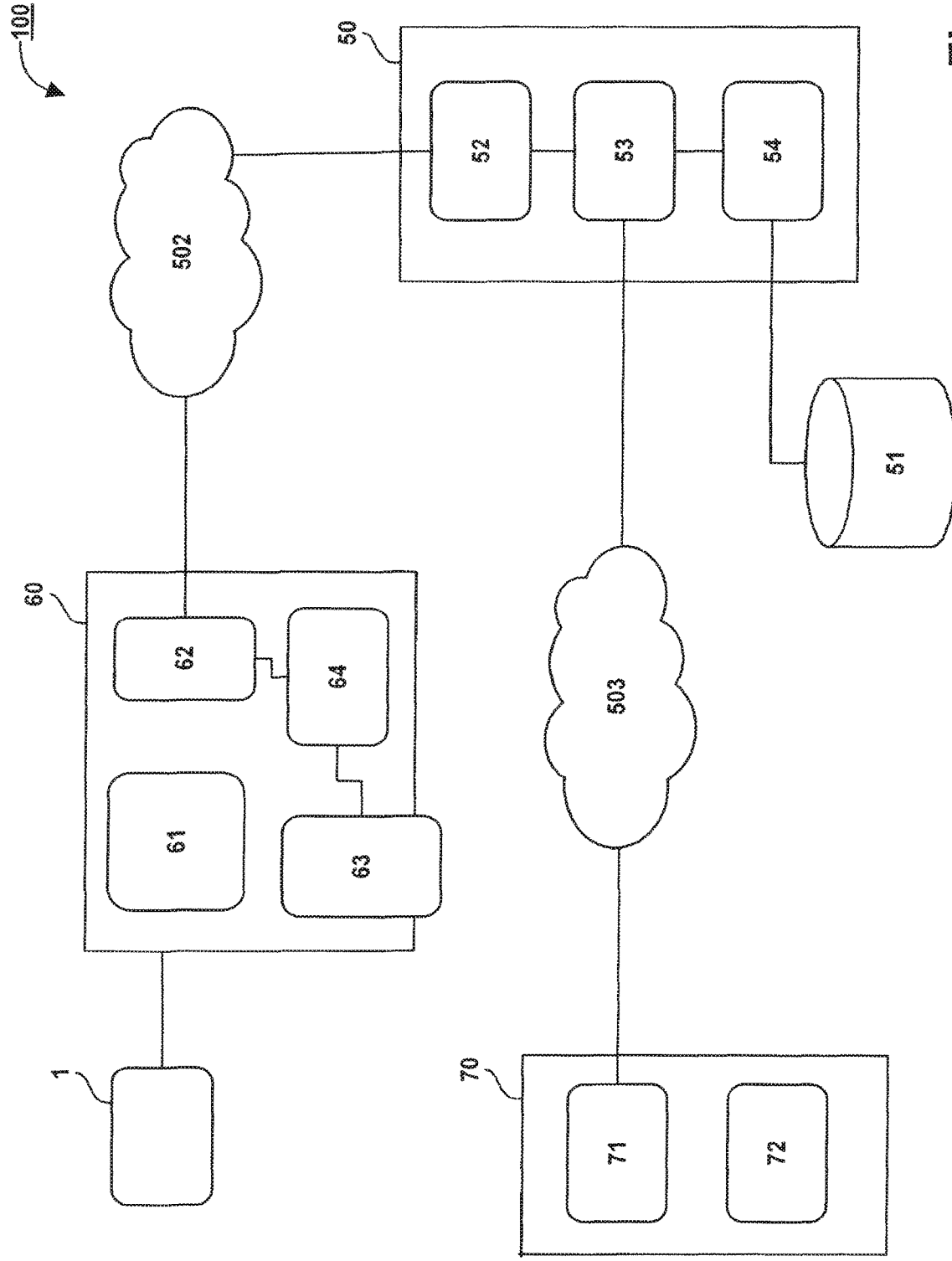
FIG. 5 shows another block diagram showing schematically the functional architecture of a system comprising a beverage preparation machine and a server according to the present invention.

In the system 100 as shown in FIG. 5 the beverage preparation machine 1 via a telemetry device 60 and via a first network 502 is in data communication with the server 50. In a preferred embodiment the first network 502 is a GSM network, but also the use of any other type of wired or wireless network is possible for enabling a one-directional or bi-directional data communication between the machine 1 and the server 50. Even though in the present embodiment an external telemetry device 60 is provided, all functionalities for communicating can be integrated into the communication module 11 of the machine 1, so that no external devices are necessary and the beverage preparation machine 1 is directly connected to the first network 502.

The user device 70, if present, is also in data communication with the server 50 via a second network 503. In a preferred embodiment the second network 503 is the internet or any other public or private network, however it is also possible to enable communication between the user device 70 and the server 50 via any other type of wired or wireless network.

In a further alternative, instead of providing separate networks for communication between the beverage preparation machine and the server 50 on one hand and the user device 70 and the server 50 on the other hand, there can also be provided one single communication network as for example shown in FIG. 4, to which all devices are connected.

Additionally to the architecture shown in FIG. 5 the user device 70 can also be in data communication with the beverage preparation machine 1 via a corresponding communication network.

The server 50 further comprises or is connected to a database 51 for storing any type of data or information, such as for example user account information, customer information, machine information or the like.

In the following the architecture of the system 100 will be further explained with reference to the non-limiting embodiment shown in FIG. 5, where the first network 502 is a GSM network and the second network 503 is an internet.

In this embodiment between the machine 1 and the GSM network 502 a telemetry device 60 is provided. The telemetry device comprises a GSM transceiver 62 for connecting to the first network 502. Further included in the telemetry device 60 is a core unit 60 for controlling the functionalities of the telemetry device 60 as well as a memory 64 for storing any type of data or information.

Optionally, there can also be provided a USB interface 63 for connecting the telemetry device 60 to the beverage preparation machine 1 or to any other device or for reading out data from the telemetry device 60 or for storing data in the memory 64 of the telemetry device 60. The communication between the machine 1 and the server 50 in a preferred embodiment is an encrypted communication.

The server 50 comprises a server GSM transceiver 52, preferably an application server 54 for connecting with the database 51 and a web server 53 for connecting with the second communication network 503, which in the present embodiment is the internet.

The user device 70 can for example be a laptop having integrated therein a browser 71 and a web server 72 for connecting with the second communication network 503.

The beverage preparation machine 1 according to the present invention comprises one or more sensors for monitoring parameters related to the beverage preparation process, for example temperature sensor, pressure sensor, flowmeter, electric power sensor, overheat sensor, scale sensor, water level sensor, ingredient recognition sensor or the like. Specifically, in a preferred embodiment of the present invention, the machine 1 is a capsule based beverage preparation machine 1 comprising a capsule recognition sensor for recognizing the number and/or type of consumed capsules. Optionally, the beverage preparation machine 1 can stored these parameters in the storage.

The beverage preparation machine 1 submits these parameters or any other information derived from these parameters via the first communication network 502 to the server 50. Hereby, the submission can be accomplished either automatically, i.e. in predefined time intervals, depending on the number or consumed capsules or the like, or the submission can happen only upon request by the server 50. In this latter case the parameters are stored in a storage of the machine 1 and sent after being polled by the server 50.

The server 50 in turn based on the received information can initiate a service functionality. Such a service functionality can for example be an indication to the customer of an upcoming maintenance and/or an indication to the customer of a shortage of an ingredient within the machine needed for preparing a beverage. Together with the indication the server can also automatically initiate a process for removing or preventing any failure or disturbance of the machine 1.

In the following, several possibilities for monitored and submitted parameters and corresponding initiated service functionalities will be given. Hereby, a single, more than one or a combination of the following mechanisms can be implemented in the system 100 according to the present invention.

The beverage preparation machine 1 comprises one or more sensors for monitoring machine related parameters, as previously explained. The term "machine related parameters" hereby intends to cover parameters indicating a status of the machine as well as parameters related to the beverage preparation process. As previously explained, the one or more sensors can submit their measurements directly to the communication module 11 for transmission to the server or they can submit their measurements instead to the control unit 21. The control unit 21 in turn can submit the pure parameters directly to the communication module 11 for transmission and/or can determine additional information based on the parameters and submit the additional information to the communication module 11 for transmission.

Based on these transmitted parameters the server can initiate one or more of the following service functionalities.

Generally, the service functionalities can comprise one or both of the following options. There can either be provided an indication to the customer, such as an indication on the display 10 of the machine, an indication electronically submitted to the user device 70 of the customer, e.g. via e-mail, SMS or the like, or an indication sent via a letter or the like. Another option is to automatically initiate steps which allow a remedy of an already existing malfunction and/or a prevention of an upcoming disturbance within the functionality of the machine 1, for example an automatic shipping of spare parts or ingredients needed for beverage preparation, an automatic set up of a communication with a help desk, an automatic appointment with maintenance personnel or the like.

It is also possible that the server 50 sends an instruction to the machine 1 to carry out a specific maintenance operation. In this case if the communication module 11 receives such an instruction, it is submitted to the control unit 21, which in turn carries out the instructed operation, such as for example an automatic cleaning process or the like.

In the following, more detailed explanations are given indicating the type of monitored and submitted parameters as well as the corresponding initiated service functionality. As already mentioned, the present invention is not limited to the described possibilities but can comprise any possible combination of the following possibilities.

A first service functionality is an indication to the customer, that there is an upcoming maintenance or service period. This can include for example an indication that the customer needs to make an appointment with a maintenance assistant. In order to further reduce the effort for the customer, the customer can also be provided with an indication of a date and time when a maintenance assistant will come for maintenance. Such a maintenance period can be calculated for example based on the number of prepared beverages, based on the time passed since the last maintenance or the like.

Alternatively or additionally the server 50 can indicate to the customer the need for performing a maintenance operation himself, such as for example cleaning machine parts, refilling the water tank, descaling the machine 1 or the like. In case that descaling becomes necessary, the server 50 can also automatically prepare shipment of a descaling kit to the customer.

Further, it can be indicated to the customer that there is the need for a replacement of a part of the machine. If depending on the monitored parameters it is decided that there is a broken part within the machine, then it can be either simply indicated to the customer that the corresponding part needs to be exchanged or the server 50 can already initiate a shipping of the corresponding part to the customer.

A further possibility is to enable the machine 1 to monitor the number of consumed capsules and to submit this number to the server 50. In this case the server 50 can compare an initial amount of capsules with the actual remaining amount of capsules and can initiate a service functionality in case of detecting that a shortage of capsule will be reached. Hereby, the beverage preparation machine 1 itself can submit the number of remaining capsules to the server 50 or the beverage preparation machine 1 can merely submit the number of consumed capsules to the server 50, which in turn has stored the number of initial capsules for example in the database 51 and correspondingly can calculate the number of remaining capsules.

In the preferred embodiment the beverage preparation machine 1 is a commercial machine 1 situated at a customer location 150, where a plurality of different users can access the machine for preparation of a beverage. In this case preferably the capsules are provided within a deposit of the machine and depending on the operation of a user on the machine, the corresponding beverage is prepared. In this case it is even easier for the beverage machine 1 and/or the server 50 to monitor the amount of consumed capsules.

If a shortage of capsules is reached, then the server 50 can automatically generate an instruction to either invite the customer to make an order for a shipment of a new stock of capsules or to prepare a shipment of a new stock of capsules for supply to the customer.

In a preferred embodiment the machine 1 comprises a capsule recognition functionality, so that the type of consumed or actually used capsule can be recognized by a corresponding capsule recognition arrangement. In this case also the type of consumed capsules together with the amount of consumed capsules are submitted to the server 50, so that the server 50 can even differentiate between different types of capsules and can indicate which type of capsule is reaching a shortage.

Since usually when preparing a beverage using a capsule a predefined amount of water is needed, it is possible to calculate based on the amount and/or type of consumed capsules the amount of consumed water. This in turn indicates whether a maintenance such as a descaling or the like is necessary. The server thus can also indicate to the customer whether there is the need for a descaling or the like.

As already described, the machine 1 preferably is a commercial machine which is used by a plurality of different users. For this purpose the present invention provides the possibility for each user to create his own user account for the machine 1 including personal settings regarding the beverage preparation process.

For this purpose a user via the user device 70 or any other device can access the server 50. He can then create a user account comprising a user identification (ID) and user settings, which are stored in database 51.

The user settings can include information on a preferred type and preparation of a beverage, such as the type of capsule used for preparing the beverage, the temperature of the water, the amount of water and so on. These settings can be configured by the user according to his personal preferences and stored within the database 51. The user will then receive an identification ID, which uniquely identifies him at the beverage preparation machine 1.

For identifying each user at the machine, a first possibility is a code or a password the user has to input at the machine 1 when preparing a beverage. This input user ID is submitted by the machine to the server 50, which in turn after reading out the corresponding data in the database 51 submits the user settings to the machine 1. Alternatively, each user can receive a user ID card which can be read by the beverage preparation machine 1 in order to recognize the personal settings.

Hereby, when the beverage machine 1 receives the user ID either from a user ID card or via a corresponding pin code, then the beverage preparation machine 1 can either have stored the corresponding settings readily within its storage, the beverage preparation machine can access the database 51 of the server 50 or can request from the server 50 the user settings in order to prepare the beverage accordingly.

If the concept of a user identification is implemented, then the beverage preparation machine 1 can also submit corresponding parameters and information to the server 50. The beverage preparation machine 1 can for example submit the user identification to the server 50 in order to indicate that the corresponding user has just requested preparation of a beverage. Additionally, the beverage machine can also submit the number and/or type of consumed capsule.

The server 50 in turn based on the submitted data can use the machine-related parameters as well as the data stored in the database 51 in order to decide whether to initiate a service functionality. If for example each user has stored within his user setting a specific amount of water for preparing his beverage, then the server 50 when looking up the user profile within the database 51 can calculate the amount of water which was consumed for preparing the different beverages. This in turn can be used for deciding on maintenance functionality, such as descaling and so on.

FIG. 6 again gives an overview over the different functionalities of the beverage preparation machine 1 and the server 50 within the system.

First one or more of the steps S1 to S4 are accomplished by the beverage preparation machine. In step S1 the number of consumed capsules is monitored, in step S2 the type of consumed capsules is monitored, in step S3 a user ID card is read and the beverage preparation process is adapted accordingly or, as described previously, alternatively a user ID input is received and the beverage preparation process is adapted accordingly. In step S4 other machine-related parameters are monitored, such as temperature, pressure, power on time or the like.

One, more or all of this information in step S5 is submitted to the server 50. As previously described, it is also possible to submit parameters to the server 50 which in turn are derived from the measured parameters. The term "monitored parameters" when used in the present application intends to cover directly measured parameters as well as parameters which are derived from the measured parameters, e.g. by calculation or comparison with other parameters.

The server in turn can determine such information as the amount of each remaining capsule type in step S6 and/or determine the amount of consumed water in step S7 and/or any other determination indicating a status of the machine 1. I steps S8 and S9 possible service functionalities are initiated. However, the shown steps are only exemplary and the present invention is not limited to these steps. In step S8 for example an indication of an upcoming maintenance can be submitted to the customer. Additionally or alternatively in step S9 an indication of a shortage of an ingredient within the beverage preparation machine 1 can be submitted.

The present invention thus provides a method and system for decreasing the effort and work needed by a customer having a beverage preparation machine at a customer location. The customer does not need to consider brakes in consumption since an automatic reordering can prevent out of stocks. He further has no management burden since the workload is shifted away from the customer. Since with the present invention a maintenance and diagnosis support is provided, the machine will operate in a hassle-free way and breakdowns will be reduced or not occur at all. Specifically scale is a major issue for intervention, which can also be avoided with the concept of the present invention.

With the method and system thus several functionalities can be provided such as an online diagnostic, consumption tracking, remote assistance, alert, monitoring and so on.

The invention is claimed as follows:

1. A method for remotely providing service functionalities for a beverage preparation machine, the beverage preparation machine configured for preparing a beverage by receiving a capsule in a capsule extraction unit, circulating a carrier liquid through the capsule in the capsule extraction unit and dispensing a resulting beverage, and the beverage preparation machine is in data communication with a remote server via a communication network, the method comprising:

monitoring a number of consumed capsules in the beverage preparation machine and automatically determining a type of each of the consumed capsules, submitting the number of consumed capsules and the type of each of the consumed capsules to the server; and initiating through the server a service functionality depending on the number of consumed capsules and the type of each of the consumed capsules.

2. The method according to claim 1, wherein the beverage preparation machine is positioned at a location of a customer which is remote from the server, and the initiating of the service functionality comprises at least one step selected from the group consisting of:

offering a service to the customer;

taking steps for automatically providing a service to the customer;

indicating to the customer an upcoming maintenance period;

indicating to the customer a shortage of an ingredient within the beverage preparation machine needed for preparing the beverage; and indicating to the customer a need to replace a part of the beverage preparation machine.

3. The method according to claim 1, wherein the initiating of the service functionality comprises at least one step selected from the group consisting of:

arranging an appointment with a maintenance assistant;

setting up a communication with a help desk; and preparing a shipment of at least one of an ingredient and a spare part for the beverage preparation machine.

4. The method according to claim 1, wherein:

the monitoring of the number of consumed capsules and the automatically determining of the type of each of the consumed capsules are performed by the beverage preparation machine, the beverage preparation machine is positioned at a location of a customer which is remote from the server, and the initiating of the service functionality comprises comparing, for each type of capsule, an initial amount of capsules within the beverage preparation machine with an actual remaining amount of capsules, and further comprises generating automatically an instruction upon detecting a shortage of capsules at the beverage preparation machine, the instruction comprising at least one of:

an invitation to the customer to make an order for a shipment of a new stock of capsules, or directions to prepare a shipment of the new stock of capsules for supply to the customer.

5. The method according to claim 1, further comprising:

accepting by the beverage preparation machine a user identification indicating user settings regarding beverage preparations;

adapting a beverage preparation process according to the user settings; and submitting information on the user identification, which is accepted by the beverage preparation machine, to the server.

6. The method according to claim 1, wherein the monitoring of the number of consumed capsules and the automatically determining of the type of each of the consumed capsules is performed by at least one sensor of the beverage preparation machine.

7. The method according to claim 1, wherein the submitting of the number of consumed capsules and the type of each of the consumed capsules to the remote server and the initiating of the service functionality are performed by a communication module of the beverage preparation machine.

8. The method according to claim 1, wherein the communication network is a wireless network.

9. The method according to claim 1, wherein the type of each of the consumed capsules comprises a type of beverage for which contents of each of the consumed capsule were formulated.

10. The method according to claim 1, further comprising:

receiving the capsule in the capsule extraction unit, wherein the capsule contains ground coffee, and the capsule extraction unit is a coffee brewing unit;

circulating the carrier liquid through the capsule in the capsule extraction unit; and dispensing the resulting beverage, wherein the resulting beverage is coffee.

11. The method according to claim 10, further comprising evacuating the capsule, after the circulating of the carrier liquid through the capsule, from the capsule extraction unit into a used capsule collector of the beverage preparation machine.

* * * * *